(No Model.)

J. H. R. WARD & C. A. NOLL.
METHOD OF LINING TUBES OR CYLINDERS.

No. 549,342. Patented Nov. 5, 1895.

WITNESSES:
INVENTORS
John H. R. Ward
Charles A. Noll
BY
ATTORNEY

UNITED STATES PATENT OFFICE.

JOHN H. R. WARD, OF STOUGHTON, MASSACHUSETTS, AND CHARLES A. NOLL, OF NEW YORK, N. Y.

METHOD OF LINING TUBES OR CYLINDERS.

SPECIFICATION forming part of Letters Patent No. 549,342, dated November 5, 1895.

Application filed August 15, 1895. Serial No. 559,365. (No model.)

*To all whom it may concern:*

Be it known that we, JOHN H. R. WARD, of Stoughton, county of Norfolk, and State of Massachusetts, and CHARLES A. NOLL, of the city, county, and State of New York, citizens of the United States, have invented certain new and useful Improvements in Methods of Lining Tubes or Cylinders, of which the following is a full, clear, and exact description.

This invention is a method of lining the interior of tubes or other cylindrical bodies with an insulating material for electrical and other purposes.

The modern method of wiring buildings for electrical distribution is to use metallic tubes, through which the wires are strung. Such tubes should be thoroughly insulated interiorly to prevent grounding or crossing of currents. Our method of insulating these tubes in its entirety consists in first filling a tube with a liquid holding in mechanical suspension or solution the insulating material in a finely-divided state with which it is desired to line the tube, then closing the ends of the tube and rotating it for a short time axially at high speed. The rotation causes the particles of solid matter held in suspension in the liquid to be thrown against the wall of the tube by centrifugal force, and there it becomes firmly embedded or attached. Afterward the tube is opened and the liquid, free of solid matter, is drawn off, leaving a coating or lining upon the interior of the tube. This is then dried and, if desirable, impregnated with a filling, such as asphaltum, after which it is ready for use.

Figure 1:
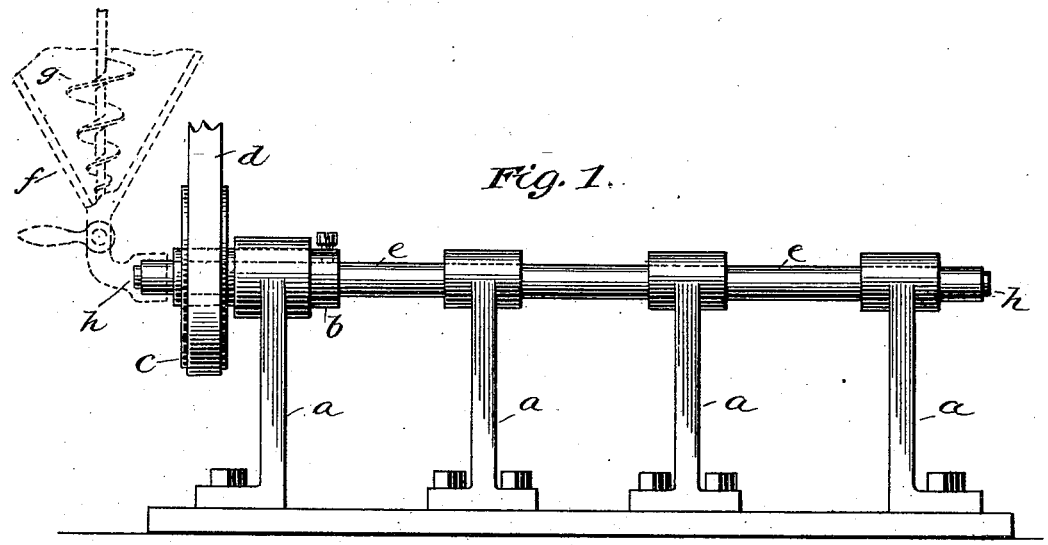
Figure 2:
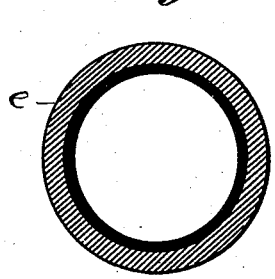

In the accompanying drawings, Figure 1 shows a conventional form of apparatus with which our invention may be carried out, and Fig. 2 is a cross-section of a tube with its insulating lining.

The apparatus is a kind of lathe, consisting of a number of bearings $a$ $a$, &c., placed in line and adapted to receive a tube of any length. In one of the bearings a rotating bushing $b$ will be placed, and this will carry a pulley $c$, to which motion is imparted by a belt $d$.

The tube is represented by $e$. Suitable arrangements will be provided for connecting one end of the tube with a hopper $f$, (shown in dotted lines,) which will contain water holding in solution materials, such as plaster-of-paris and fine asbestos. This mixture should be agitated by a stirrer $g$ to keep it uniform. The tube is to be completely filled with this material and then its ends closed in any desired manner, plugs $h$ being here shown. The tube is then rotated at a high speed for a period of about five minutes, after which it is taken out of the lathe and the liquid removed. It will then be found that the tube is provided with an even lining of plaster-of-paris and asbestos. If the speed at which the tube is driven is high, the lining will be firmly packed and comparatively free from moisture, and may therefore be quickly dried either by the circulation of air or application of heat. When dry the pores of the lining may be filled with asphaltum or pitch by pouring some of that material into the tube and removing the excess.

Our invention is not limited to the particular materials mentioned herein nor to any particular apparatus for carrying out the method, and it will be understood that the nature of the lining may be moisture-proof or fireproof, as well as an insulator of electricity. We will state, however, that to get the best results the tube should be completely filled with the liquid solution, as otherwise the layer may vary in thickness. The average thickness will depend upon the quantity of solid matter held in suspension and the time of rotation.

Having described our invention, we claim—

1. The method described of lining tubes and cylinders consisting in placing in the tube or cylinder a liquid holding solid matter in suspension, then rotating the tube.

2. The method described of lining tubes and cylinders consisting in completely filling the tube or cylinder with a liquid holding solid matter in suspension, then rotating the tube.

3. The method described of lining tubes and cylinders consisting in placing in the tube or cylinder a liquid holding solid matter in suspension, then rotating the tube to deposit the lining, then removing the liquid and drying the lining.

4. The method described of lining tubes and cylinders with insulating material consisting in placing in the tube or cylinder a liquid holding solid matter in suspension, then rotating the tube to deposit the lining, then removing the liquid and drying the lining and finally filling the pores of the lining with an insulating compound such as asphaltum.

In testimony whereof we subscribe our signatures in presence of two witnesses.

JOHN H. R. WARD.
CHAS. A. NOLL.

Witnesses:
FRANK S. OBER,
JOHN KRALGER.